US011532861B2

(12) United States Patent
Gormanns et al.

(10) Patent No.: US 11,532,861 B2
(45) Date of Patent: Dec. 20, 2022

(54) METHOD FOR PRODUCING A BATTERY DEVICE FOR A MOTOR VEHICLE, BATTERY DEVICE, AND MOTOR VEHICLE WITH A BATTERY DEVICE

(71) Applicant: AUDI AG, Ingolstadt (DE)

(72) Inventors: Marc Gormanns, Erlenbach (DE); Tobias Benker, Heilbronn (DE); Michael Frauenhofer, Aichach (DE); Oliver Schieler, Gaimersheim (DE); Michael Schüßler, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 316 days.

(21) Appl. No.: 16/936,853

(22) Filed: Jul. 23, 2020

(65) Prior Publication Data

US 2021/0028435 A1 Jan. 28, 2021

(30) Foreign Application Priority Data

Jul. 25, 2019 (DE) ..................... 10 2019 211 092.4

(51) Int. Cl.
*H01M 10/00* (2006.01)
*H01M 50/60* (2021.01)
*H01M 10/613* (2014.01)
*H01M 50/256* (2021.01)

(52) U.S. Cl.
CPC ......... *H01M 50/60* (2021.01); *H01M 10/613* (2015.04); *H01M 50/256* (2021.01)

(58) Field of Classification Search
CPC ........... H01M 10/6554; H01M 10/647; H01M 50/60; H01M 10/613
See application file for complete search history.

(56) References Cited

U.S. PATENT DOCUMENTS

2016/0074866 A1* 3/2016 Stokes ................... A61J 1/1406
73/864.91
2020/0280108 A1* 9/2020 Tomar ................. H01M 50/574
2021/0242890 A1* 8/2021 Hurt ..................... H04B 1/3888

FOREIGN PATENT DOCUMENTS

| DE | 102015103309 A1 | 9/2015 |
| DE | 102017116420 A1 | 1/2018 |
| DE | 102018206800 A1 | 11/2019 |
| DE | 102018208070 A1 | 11/2019 |

OTHER PUBLICATIONS

German Examination Report dated Apr. 28, 2020 in corresponding German Application No. 10 2019 211 092.4; 20 pages; Machine translation attached.

* cited by examiner

*Primary Examiner* — Cynthia H Kelly
*Assistant Examiner* — Monique M Wills
(74) *Attorney, Agent, or Firm* — Maier & Maier, PLLC

(57) ABSTRACT

A battery device and a method for producing a battery device for a motor vehicle. In said method, a cooling base element and a battery module are provided, and the battery module is mounted on the cooling base element, forming at least one gap between a battery module region and a cooling base region. A filling device is then coupled to at least one filling opening of at least one filling tube, with the at least one filling tube extending into the at least one gap, and a heat conducting medium is introduced from the filling device through the filling tube into the at least one gap.

20 Claims, 3 Drawing Sheets

METHOD FOR PRODUCING A BATTERY DEVICE FOR A MOTOR VEHICLE, BATTERY DEVICE, AND MOTOR VEHICLE WITH A BATTERY DEVICE

FIELD

The disclosure relates to a method for producing a battery device for a motor vehicle, a battery device, and a motor vehicle having such a battery device.

BACKGROUND

A battery device known from the prior art, in particular a high-voltage battery for an electrically operated motor vehicle, typically has one or more battery modules, which can in turn have a plurality of individual battery cells. Such individual battery cells are typically strung together in the form of a cell stack and accommodated in a module housing.

To be able to dissipate heat from the battery module, which can develop, for example, when power is drawn or during rapid charging, the battery module can be mounted on a cooling base element, for example, which can absorb and remove the heat from the battery module. Due to the manufacturing process, however, when the battery module and the cooling base element are assembled, tolerances may arise that form a gap between the battery module and the cooling base element. In order to efficiently dissipate the generated heat despite the gap, a heat conducting medium, for example a heat conducting paste, also called gap filler, is customarily used between the battery module and the cooling base element.

In the past, such a gap filler has been applied in the form of a bead or a flat layer to the cooling base element and then pressed into the area by positioning and lowering the battery module.

This manner of introducing the heat conducting medium between the battery module and the cooling base element has numerous disadvantages. Among other things, very strong forces must be applied to the battery module and the cooling base element to achieve a sufficiently uniform distribution of the heat conducting medium.

At the same time, however, these forces must not cause damage to the battery module or the cooling base element, which in turn results in a complex, sturdy, and costly design of the battery modules. Furthermore, during mounting of the battery module on the cooling base element, it is not possible to check whether the gap has been completely filled by the heat conducting medium.

SUMMARY

The object of the present invention is to provide a method and a battery device that provide a cost-effective, resource-efficient, and simple option for applying a heat conducting medium between a battery module and a cooling base element of a battery device.

The method according to the invention for producing a battery device for a motor vehicle comprises the steps of providing a cooling base element of the battery device and a battery module of the battery device, mounting the battery module on the cooling base element thereby forming at least one gap between a battery module region of the battery module and a cooling base region of the cooling base element, and coupling a filling device to at least one filling opening of at least one filling tube, the at least one filling tube extending into the at least one gap. The method further comprises introducing a heat conducting medium from the filling device through the filling tube into the at least one gap.

In other words, to produce the battery device a battery module can be mounted on a cooling base element, which at the same time can act as a support structure for the battery module, so that at least one gap is formed on an underside of the battery module and an upper side of the cooling base element in a battery module region and a cooling base region. The battery module region can comprise, for example, a region of the battery module in which the battery cells are arranged and in which most of the heat is generated during a rapid charging process or a drawing of power. Correspondingly, the cooling base region of the cooling base element can be configured to dissipate the heat according to known methods. The mounting of the battery module on the cooling base element can comprise screwing, riveting, and gluing, for example, and the gap between the battery module and the cooling base element can have a height of up to 3 millimeters, for example.

To fill the gap with a heat conducting medium, a filling device can be coupled reversibly and non-destructively to a filling opening of a filling tube, and the heat conducting medium can then be forced or pumped out of the filling device through the filling tube into the gap. The filling device can be positioned, guided manually, for example, or preferably automatically, in particular by a robot, at the filling opening, and the heat conducting medium can be injected into the gap, factoring in a permissible filling pressure of up to 4 bar, for example, preferably 2.5 bar. The filling tube can preferably be provided in an element of the battery device and can have a length, for example, of up to 15 cm through the battery device into the gap.

The heat conducting medium can preferably comprise a liquid TIM (TI material) or a mixture of several TIMs. As they are introduced, TIMs adapt particularly well to the shape of the gap, so that the gap can be filled especially completely with the heat conducting medium.

The invention offers the advantage that the introduction of the heat conducting medium into the gap can be carried out separately from the mounting of the battery module onto the cooling base element. In this way, stress and strain in the battery device can be avoided. Thus, the method can facilitate a process-reliable and reproducible assembly of a battery device. Moreover, the introduction of the heat conducting medium into the gap allows a specific spread of a formed flow front into the gap to be achieved. Gas pockets in the gap along with an incomplete filling of the gap with the heat conducting medium are thereby avoided. Thus, an inexpensive and efficient method for filling the gap with the heat conducting medium can be provided.

The invention also includes embodiments that result in additional advantages.

In one embodiment it is provided that the at least one filling opening and the filling tube are formed integrally with the battery device, and the at least one filling opening is arranged on a surface of the battery device, in particular on a surface of the battery module, and the filling tube extends through the battery device into the gap. In other words, the filling tube can be incorporated into the battery device, in particular the battery module, prior to assembly, so that a tubular access from an outer surface of the battery device into the gap can be provided. Alternatively, however, the filling opening can also be arranged on an externally accessible surface of the cooling base element, in which case the filling tube extends through the cooling base element into the gap. The filling tube can have a diameter of 2 to 10 millimeters, for example, and a length of 4 to 15 centimeters through the battery device. This embodiment offers the advantage that the filling opening on the surface of the battery device is easily accessible, thus enabling a simple and efficient filling of the gap during the production of the battery device, in particular by a robot-assisted filling device that can couple automatically to the filling opening on the surface.

A further embodiment provides that the filling tube opens into at least one channel structure in the gap, the channel structure being provided by a depression in the longitudinal direction in the cooling base element. In other words, the cooling base element can have a channel structure or corrugation in the longitudinal direction of the cooling base element, which distributes the heat conducting medium in a longitudinal direction along the channel structure before it is distributed over the remaining surface area of the gap. The channel structure can preferably open at the end of the filling tube, so that the heat conducting medium is distributed in the channel structure first, before being distributed in the gap, i.e., the cavity area between the battery module and the cooling base element. The channel structures, which, alternatively or in addition to running in the longitudinal direction, can also run between the individual battery cells of the battery module, may be stamped into the cooling base element, for example. This embodiment offers the advantage of ensuring a low-pressure distribution of the heat conducting medium before the heat conducting medium is distributed uniformly in the gap, thereby reducing the formation of gas pockets.

A further embodiment provides that the filling opening is arranged in a hole of a reference point system (RPS). A reference point system refers to a tolerance management concept by means of which an unerring and reproducible positioning of individual parts and assemblies, in this case the battery module and the cooling base element, can be carried out. Arranging the filling opening in a hole of the reference point system produces the advantage that the filling opening has a low tolerance position, which can be approached reproducibly, for example by a robot. In particular, a maximum deviation may be +/−0.2 millimeters.

One embodiment provides that the filling opening is formed as a conical depression and the filling device has a conical injection head, which is non-positively coupled to the conical depression of the filling opening. In this case, for example, the conical injection head of the filling device can be configured as a nozzle that injects the heat conducting medium through the filling opening into the filling tube. The docking point of the filling opening on the injection head can be embodied as conical with the widest possible collar in order to achieve a good sealing effect by force-locking connection. Sealing elements, such as sealing rings, can preferably be attached on the injection head and/or in the conical depression, producing an additional sealing effect against the outside. This embodiment offers the advantage that a simple option for coupling the filling device to the filling opening is provided, while at the same time achieving an improved sealing for the introduction process.

A further embodiment provides that the gap is bounded outwardly by a seal, which is applied to a side of the battery module that faces the cooling base element. The seal can be applied to the cooling base element prior to assembly, for example, and can comprise, for example, a foam material such as polyurethane or silicone or can be shaped as a molded seal. During assembly of the battery module with the cooling base element, this seal can then be pressed onto the battery module, thereby forming the outer boundary of the gap. Thus, the gap can preferably be completely surrounded peripherally by the seal. In this way, a particularly flexible seal that is adapted to the respective contours of the battery module or the cooling base element can be produced. This embodiment offers the advantage that a simple and inexpensive sealing of the gap can be achieved, resulting in a savings on additional heat conducting medium and thus on costs, since the heat conducting medium cannot escape unhindered from the gap through the seal.

In one advantageous embodiment, it is provided that a vent opening that is monitored by a sensor device is provided in the seal, and when an escape of the heat conducting medium through the vent opening is detected by the sensor device, the introduction process is ended. In other words, at a defined point on the seal a vent opening is provided, which is monitored by a sensor device to detect any escape of the heat conducting medium during the introduction process.

When the sensor device determines that heat conducting medium is escaping from the vent opening during the introduction process, the sensor device can send a signal to the filling device to end the introduction process. The vent opening can preferably be provided at a point on the seal where the gap is last filled by the heat conducting medium, in particular at a point on the seal that is located on a side opposite the mouth of the filling tube into the gap, preferably at an end of this side that is spaced apart from the filling tube. This means that, for example in the case of a rectangular gap, the filling tube can open in an upper left corner into the gap, and the vent opening can be located near a lower right corner of the gap. The vent opening can have a width of 1 to 2 centimeters, for example, and can be provided by a stamping in the cooling base region.

The sensor device can comprise an optical sensor and/or an ultrasonic sensor that monitors the vent opening. A laser or a camera, for example, can be provided as the optical sensor, which monitors the vent opening and can detect a height difference. For this purpose, the optical sensor can be located above the vent opening, for example. An ultrasonic sensor as a sensor device can be located below the vent opening, for example, in particular in a base of the cooling base element. Said sensor can then detect an escape of the heat conducting medium by a change in the reflected ultrasound signals.

This embodiment offers the advantage that the gap can be filled completely while avoiding gas pockets. In addition, a savings on heat conducting medium and thus on costs can be realized, since only enough heat conducting medium to fill the gap completely and to detect the escape of any heat conducting medium from the vent opening is required.

One embodiment provides that a second filling opening having a second filling tube is provided, through which a second gap between a second battery module region of the battery module and a second cooling base region of the cooling base element is filled with the heat conducting medium, the gap and the second gap being separated from one another by a barrier. In other words, multiple gaps, at least two gaps, in different regions between the battery module and the cooling base region can be separated from one another by one or more barriers and filled individually. The barrier can be introduced, for example, in the form of a foam seal or molded lip, for example a plastic lip, at the center of the battery module, thereby producing a separation of the two half cavities, i.e., the two gaps.

Another option for creating the barrier consists in compressing a mica layer in the region of the barrier, wherein the mica layer (sheet mica) can be provided on the battery cells of the battery module for the purpose of insulation and thermal conductivity. For example, this mica layer can extend further downward in the region of the barrier by the height of the gap, for example two millimeters, in order to produce a barrier.

This embodiment offers the advantage that shorter flow lengths can be achieved in the intermediate layer of the battery module region, and as a result, less pressure is required to introduce the heat conducting medium. In this way, possible damage and deformation as a result of the pressure can be avoided.

A further embodiment provides that, during the introduction process, a mechanical counter support supports the cooling base element from below. The cooling base element can have a narrow wall thickness, in particular, and can bulge downward under excessively high pressure. To prevent this, a mechanical counter holder, which may be a punch held in a spring bearing, for example, can be moved variably from below toward the cooling base element and fixed there for the introduction process, so that the cooling base element is supported. This embodiment offers the advantage that, during the introduction process, the pressure on the cooling base element can be absorbed by the mechanical counter holder, thereby preventing damage.

Also provided according to the invention is a battery device having a battery module and a cooling base element, wherein the battery module is mounted on the cooling base element, forming a gap between a battery module region of the battery module and a cooling base region of the cooling base element. The battery device further has a filling opening of a filling tube that extends into the gap, the filling opening being configured to couple to a filling device in order to introduce a heat conducting medium through the filling tube into the gap. The battery device produces the same advantages and possible variations as in the method.

A further aspect of the invention relates to a motor vehicle having such a battery device. The motor vehicle according to the invention is preferably designed as an automobile, in particular as an electrically operated passenger car or truck, or as a passenger bus or motorcycle.

The invention also includes refinements of the battery device according to the invention that have features as have already been described in connection with the refinements of the method according to the invention. For that reason, the corresponding refinements of the battery device according to the invention will not be described again here.

The invention also comprises combinations of the features of the described embodiments.

BRIEF DESCRIPTION OF THE DRAWINGS

In the following, exemplary embodiments of the invention will be described. In the drawings.

DETAILED DESCRIPTION

The exemplary embodiments explained in the following are preferred embodiments of the invention. In the exemplary embodiments, the described components of the embodiments each represent individual features of the invention to be considered independently of one another, which each also refine the invention independently of one another. The disclosure is therefore also intended to include combinations of the features of the embodiments other than those depicted here. Furthermore, the described embodiments can also be supplemented by additional features of the invention that have already been described.

In the figures, the same reference signs are used to denote elements that have the same function.

Figure 1:
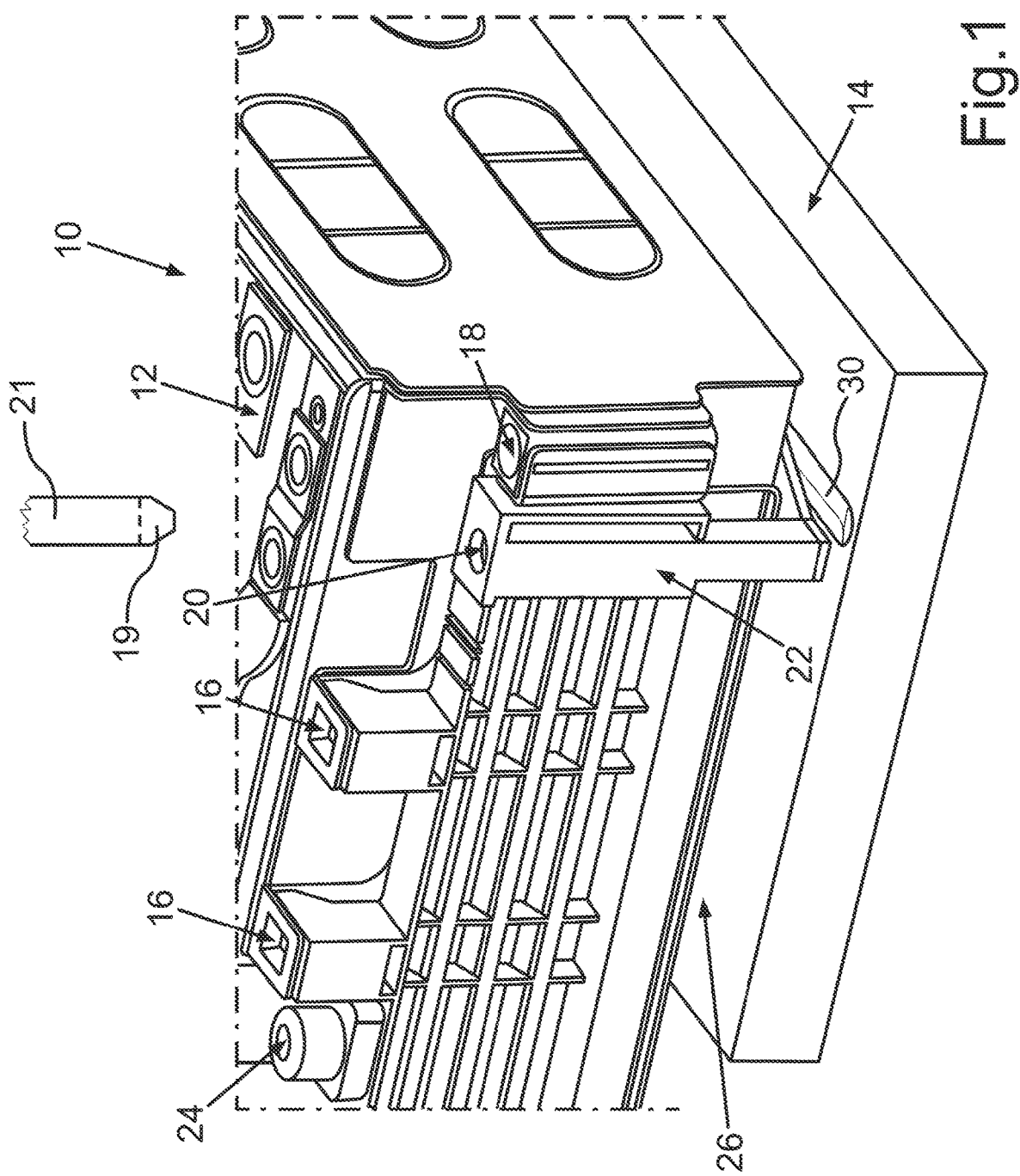
FIG. 1 shows a perspective view of a battery device according to one exemplary embodiment.

FIG. 1 shows a section of a schematic depiction of a battery device 10 according to one exemplary embodiment. In the battery device 10 shown here, a battery module 12 and a cooling base element 14, which can be mounted on the underside of the battery module, are shown. For assembly by a robot, for example, the battery module 12 can be placed via gripping openings 16 on the cooling base element 14 and fastened to the cooling base element 14, for example, by screwing at the screwing point 18.

In order to position the battery module 12 precisely on the cooling base element 14, a hole in a reference point system 20 can also be provided, which, in addition to being used for positioning the battery module, can also serve as a filling opening 20 for introducing a heat conducting medium into a gap 26 that is formed between the battery module 12 and the cooling base element 14 during assembly. In particular, the heat conducting medium, which is also referred to as gap filler, can be provided for better heat dissipation of heat from the battery module 12 into the cooling base element 14.

For filling the gap 26 with the heat conducting medium, a filling device 21 can be provided, which has a conical injection head 19, for example, that can be non-positively coupled to a corresponding conical depression in the filling opening 20. The heat conducting medium can then be introduced from the filling opening 20 through a filling tube 22 into the gap 26. The filling tube may be formed integrally with the battery device 10 and the filling opening 20 may be located, in particular, on a surface of the battery module. This offers the advantage that the filling device 21, which may be robot-controlled, for example, can better reach the filling opening 20. Moreover, by also situating the filling opening 20 in the hole in the reference point system 20, a more accurate approach of the filling opening 20 is enabled.

It can preferably be provided that the filling tube 22 opens into a channel structure 30 in the gap 26, which is provided by a depression extending in the longitudinal direction in the cooling base element 14 and in which the heat conducting medium can flow initially in the longitudinal direction before it spreads over the entire width of the gap.

The battery device 10 can deliver energy to an electrically operated motor vehicle via a plug 24, for example, which can supply the current from the battery module 12 to the electrically operated motor vehicle.

Figure 2:
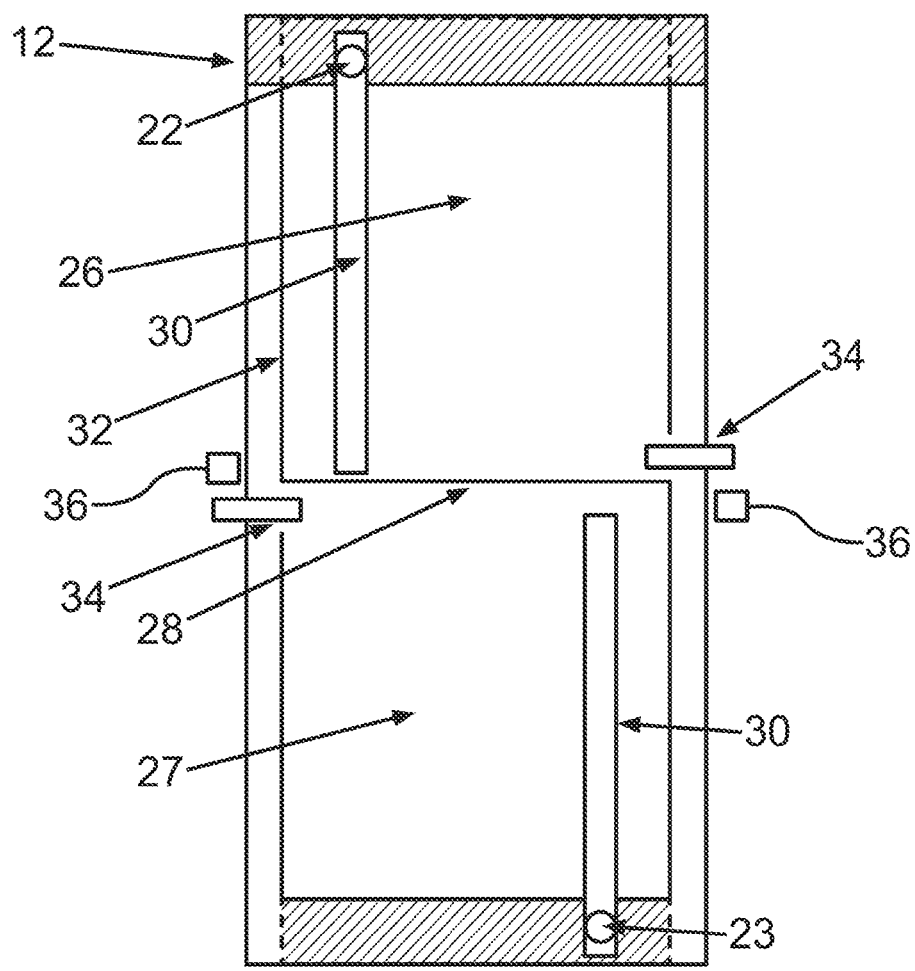
FIG. 2 shows a schematic view of the underside of a battery module according to one exemplary embodiment.

FIG. 2 shows a bottom view of a battery module 12 according to one exemplary embodiment. A bottom view in this case means a view of the underside of the battery module, which is placed on the cooling base element 14, from the direction of the cooling base element (not shown in FIG. 2). In this view, the gap 26 between a battery module region of the battery module and a second gap 27 between a second battery module region of the battery module and a cooling base region of the cooling base element are shown separated by a barrier 28. The gaps 26, 27, which serve as cavity areas for the heat conducting medium, can in particular have a height of 0.5 to 2.5 millimeters and extend over the region of the battery cells of the battery module.

The barrier 28, which separates the two gaps 26, 27 from one another, can be attached, for example, on a side of the battery module that faces the cooling base element, preferably at a boundary between two battery cells. The barrier 28 here can be in the form of a foam seal or a molded lip made of plastic. The subdivision into at least two gaps or half-cavities offers the advantage that less pressure has to be applied to fill the gaps 26, 27 with the heat conducting medium, thereby enabling damage or deformations resulting from the pressure to be minimized.

The gaps 26, 27 can be filled here via the filling tube 22 and via the second filling tube 23; in this depiction, the end points of the respective filling tubes are shown in the respective gaps.

The filling tubes 22, 23 can preferably open into a channel structure 30, which provides a distribution of the heat conducting medium in a longitudinal direction of the gap before the heat conducting medium is distributed in the remainder of the gap 26, 27. The heat conducting medium can thus be distributed in the longitudinal direction with little pressure, thereby allowing deformations and damage upon introduction of the heat conducting medium to be minimized and enabling an even distribution of the heat conducting medium. For this purpose, the channel structure 30 can have a depth of one millimeter, for example, and ideally can begin just below the mouth of the filling pipe 22, 23 into the gap. In FIG. 2, the channel structure 30 is depicted schematically on the battery module 12. Preferably, however, the channel structure 30 can be provided in the cooling base element 14, as in this way, any impairment of battery cells of the battery module can be ruled out.

The respective gap 26, 27 can additionally be bounded outwardly by a seal 32, which prevents the heat conducting medium from escaping to the outside, that is to say, from the gap 26, 27. For this purpose, on the cooling base element 14, for example, a foam material or a molded seal can be applied to the edge of the cooling base element 14 and/or to the edge of the battery module 12, preferably forming a seal that will withstand the pressure of the heat conducting medium in the gap when the battery module is mounted on the cooling base element. This offers the advantage that no heat conducting medium is forced out of the gap during the introduction process, allowing a cost savings.

Preferably, however, a vent opening 34 for the respective gap 26, 27 can be provided in the seal 32, through which the heat conducting medium can escape and which can be monitored by a sensor device 36. Said vent opening 34 can be provided, for example, by a stamped area 0.5 to one centimeter wide in the cooling base element and can preferably be arranged on a side opposite and spaced apart from the filling tube 22, 23, so that the vent opening 34 is the last region to be filled with the heat conducting medium. This offers the advantage that when an escape of heat conducting medium from the vent opening 34 is detected, the sensor device 36 can determine that the respective gap 26, 27 is completely filled. The sensor device 36 can then send a stop signal to the filling device, for example, thereby ending the process of introducing the heat conducting medium. This offers the advantage that a gas pocket in a respective gap 26, 27 can be avoided and that costs for excess heat conducting medium can be saved, since only enough heat conducting medium to fill the gaps 26, 27 completely is introduced.

Figure 3:
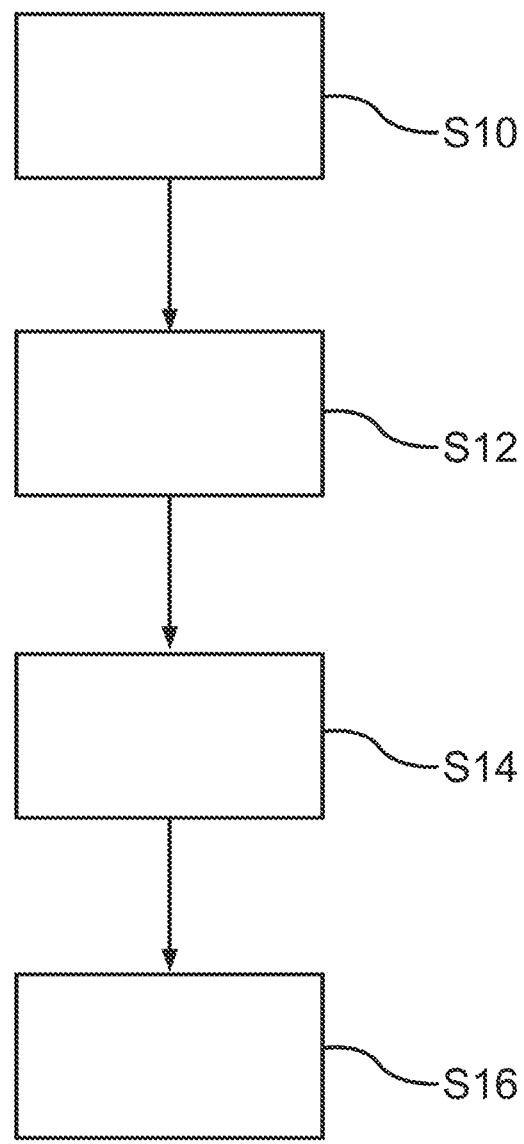
FIG. 3 shows a schematic process diagram of one exemplary embodiment.

FIG. 3 shows a schematic process diagram outlining the production of a battery device for a motor vehicle according to one exemplary embodiment. In this case, in a step S10, a cooling base element 14 of the battery device 10 and a battery module 12 of the battery device 10 can be provided.

In a step S12, the battery module 12 can be mounted on the cooling base element 14, forming at least one gap 26 between a battery module region of the battery module and a cooling base region of the cooling base element.

In a step S14, a filling device can then be coupled to at least one filling opening 20 of at least one filling tube 22, with the at least one filling tube 22 extending into the at least one gap 26.

Finally, in a step S16, a heat conducting medium can be introduced from the filling device through the filling tube 22 into the at least one gap 26.

Overall, the examples show how a battery device and a process for gap filler injection can be provided by the invention.

The invention claimed is:

1. A method for producing a battery device for a motor vehicle, comprising:
    providing a cooling base element of the battery device and a battery module of the battery device;
    mounting the battery module on the cooling base element, forming at least one gap between a first region of the battery module and a first region of the cooling base element;
    coupling a filling device to at least one filling opening of at least one filling tube, the at least one filling tube extending into the at least one gap; and
    introducing a heat conducting medium from the filling device through the at least one filling tube into the at least one gap.

2. The method according to claim 1, wherein the at least one filling opening and the at least one filling tube are formed integrally with the battery device, and
    wherein the at least one filling opening is arranged on a surface of the battery device and the at least one filling tube extends through the battery device into the gap.

3. The method according to claim 1, wherein the at least one filling tube opens into at least one channel structure in the gap, and
    wherein the channel structure is formed as a depression in the cooling base element.

4. The method according to claim 1, wherein the at least one filling opening is arranged in a hole of a reference point system.

5. The method according to claim 1, wherein the at least one filling opening is configured as a conical depression, and the filling device has at least one conical injection head which is non-positively coupled to the conical depression of the at least one filling opening.

6. The method according to claim 1, wherein the at least one gap is further bounded by a seal which is applied to a side of the battery module that faces the cooling base element.

7. The method according to claim 6, wherein a vent opening is provided in the seal and monitored by a sensor device, and
    wherein introduction of the heat conducting medium is halted when the sensor device detects an escape of the heat conducting medium through the vent opening.

8. The method according to claim 1, wherein a second gap is formed between a second region of the battery module and a second region of the cooling base element, and the second gap is provided with a second filling opening and filling tube through which the second gap is filled with the heat conducting medium, and
    wherein the at least one gap and the second gap are separated from one another by a barrier.

9. The method according to claim 1, wherein a mechanical counter support supports the cooling base element from below during introduction of the heat conducting medium.

10. A battery device comprising a battery module and a cooling base element, wherein the battery module is mounted on the cooling base element with a gap formed therebetween, wherein the battery device further comprises a filling opening of a filling tube, which extends into the gap, and wherein the filling opening is configured to be coupled to a filling device which introduces a heat conducting medium through the filling tube into the gap.

11. The method according to claim 2, wherein the at least one filling tube opens into at least one channel structure in the gap, and wherein the channel structure is formed as a depression in the cooling base element.

12. The method according to claim 2, wherein the at least one filling opening is arranged in a hole of a reference point system.

13. The method according to claim 3, wherein the at least one filling opening is arranged in a hole of a reference point system.

14. The method according to claim 2, wherein the at least one filling opening is configured as a conical depression, and the filling device has at least one conical injection head which is non-positively coupled to the conical depression of the at least one filling opening.

15. The method according to claim 3, wherein the at least one filling opening is configured as a conical depression, and the filling device has at least one conical injection head which is non-positively coupled to the conical depression of the at least one filling opening.

16. The method according to claim 4, wherein the at least one filling opening is configured as a conical depression, and the filling device has at least one conical injection head which is non-positively coupled to the conical depression of the at least one filling opening.

17. The method according to claim 2, wherein the at least one gap is bounded toward the outside by a seal, which is applied to a side of the battery module that faces the cooling base element.

18. The method according to claim 3, wherein the at least one gap is further bounded by a seal which is applied to a side of the battery module that faces the cooling base element.

19. The method according to claim 4, wherein the at least one gap is further bounded by a seal which is applied to a side of the battery module that faces the cooling base element.

20. The method according to claim 5, wherein the at least one gap is further bounded by a seal which is applied to a side of the battery module that faces the cooling base element.

* * * * *